US012763564B2

(12) United States Patent
Maass et al.

(10) Patent No.: US 12,763,564 B2
(45) Date of Patent: Oct. 13, 2026

(54) SELF TENSIONED CABLE GROUNDING DEVICE

(71) Applicant: Hubbell Incorporated, Shelton, CT (US)

(72) Inventors: William Michael Maass, St. Louis, MO (US); Nicholas Adam Santoro, Edwardsville, IL (US)

(73) Assignee: Hubbell Incorporated, Shelton, CT (US)

( * ) Notice: Subject to any disclaimer, the term of this patent is extended or adjusted under 35 U.S.C. 154(b) by 147 days.

(21) Appl. No.: 18/237,662

(22) Filed: Aug. 24, 2023

(65) Prior Publication Data

US 2024/0072527 A1 Feb. 29, 2024

Related U.S. Application Data

(60) Provisional application No. 63/401,235, filed on Aug. 26, 2022.

(51) Int. Cl.

*H02G 15/04* (2006.01)
*H02G 3/06* (2006.01)
*H02G 15/013* (2006.01)

(52) U.S. Cl.

CPC ......... *H02G 15/046* (2013.01); *H02G 3/0675* (2013.01); *H02G 15/013* (2013.01)

(58) Field of Classification Search

CPC .......... H02G 3/02; H02G 3/06; H02G 3/0641; H02G 3/0658; H02G 3/0675; H02G 3/0683; H02G 3/0691; H02G 3/08; H02G 3/081; H02G 3/083; H02G 3/22; H02G 15/013; H02G 15/02; H02G 15/04; H02G 15/046; H01R 9/03; H01R 13/52; H01R 13/5221; H01R 15/04

USPC ...... 174/65, 74 R, 78, 84 R, 88 C, 650, 652, 174/655; 439/98, 462, 579, 580, 583, 439/610

See application file for complete search history.

(56) References Cited

U.S. PATENT DOCUMENTS

| | | | | | |
|---|---|---|---|---|---|
| 4,273,405 | A | * | 6/1981 | Law | H02G 3/065 439/98 |
| 4,490,576 | A | * | 12/1984 | Bolante | H02G 3/0616 411/525 |
| 4,513,172 | A | * | 4/1985 | Matsui | H02G 3/065 174/653 |
| 4,515,991 | A | * | 5/1985 | Hutchison | H02G 3/0616 29/858 |
| 4,739,126 | A | * | 4/1988 | Gutter | H02G 3/065 439/98 |

(Continued)

OTHER PUBLICATIONS

ABB, Technical Data Sheet: ABB cable glands—ST Star Teck series, Copyright 2019, 3 pages.
Star Tech—Teck and tray cable fittings, Aug. 2020, 34 pages.

*Primary Examiner* — William H. Mayo, III
(74) *Attorney, Agent, or Firm* — Dilworth IP, LLC

(57) ABSTRACT

A cable gland including an entry component including an inner surface with an abutment, a backnut removably attachable to the entry component, a cavity extending through the entry component and the backnut, and a grounding device configured to rest against the abutment. The grounding device includes a rim, an inner edge, and a plurality of fingers extending inward and downward from the inner edge. The grounding device is made of a conductive material, such as spring steel.

16 Claims, 12 Drawing Sheets

(56) References Cited

U.S. PATENT DOCUMENTS

| | | | | | |
|---|---|---|---|---|---|
| 5,059,747 | A * | 10/1991 | Bawa | H02G 3/0675 | 174/541 |
| 5,942,730 | A * | 8/1999 | Schwarz | H02G 15/04 | 174/84 R |
| 5,951,327 | A * | 9/1999 | Marik | H01R 13/426 | 439/607.44 |
| 6,162,995 | A * | 12/2000 | Bachle | H02G 3/088 | 285/322 |
| 6,639,146 | B1 * | 10/2003 | Chiu | H02G 3/0666 | 439/98 |
| 8,274,000 | B2 * | 9/2012 | Smith | H02G 3/0616 | 174/650 |
| 8,690,599 | B2 * | 4/2014 | Bartholoma | H02G 3/0666 | 439/98 |
| 9,647,439 | B1 * | 5/2017 | Gretz | H02G 15/013 | |
| 10,811,863 | B1 * | 10/2020 | Gretz | H02G 3/0691 | |

* cited by examiner

SELF TENSIONED CABLE GROUNDING DEVICE

FIELD OF THE INVENTION

The present disclosure relates to cable glands, and more particularly, to a self-tensioned grounding device for use in cable glands.

BACKGROUND

Cable glands are protective devices for physically and electrically routing a cable, such as an electrical cable. Also known as cable connectors or cable fittings, cable glands may be constructed from metallic or non-metallic materials, depending on the intended application. They are generally used as a sealing and termination device to ensure that the enclosure supporting the cable inside maintains an internal environment suitable for enabling a cable to perform its intended functions in a variety of different external environments. Some of these external environments can be very hazardous to the functioning and performance of the enclosed cable without the cable gland. For example, the types of hazardous environments cable glands are used in include fresh and salt water, temperature extremes, corrosive chemicals, and combustible or explosive materials.

Electrical cables that are passed through cable glands may contain a number of electrically conductive elements, each typically including insulated copper wiring, to transmit power and/or electrical signals. The electrical cables may also be armored, meaning that they have a protective layer of armor, such as spiraled metal, around the wires.

In many applications, it is desired to ground an electrical cable within a cable gland. Existing cable grounding techniques generally require precise compression of an environmental seal to position a grounding mechanism onto an armored cable. This can be down independently with separate components compressing each element individually or one component compressing the seal and compressing the grounding mechanism at the same time. This requires additional assembly time and increased length to the cable gland.

There is a need for improved grounding devices and methods for cable glands. The present invention solves these and other problems in the prior art.

SUMMARY

An object of the present invention is to provide a grounding device adapted for self-tensioned grounding such that it eliminates the requirement of compression on the grounding element, therefore reducing the length of the cable gland design. In some embodiments, grounding is accomplished via tension in a spring steel tang design. An armored cable is pushed through the opening of the tang which flexes to create a compressive force against the armor to create a reliable ground path from the armor to the cable gland.

In one exemplary embodiment according to the present disclosure, a cable gland is provided, including an entry component including an inner surface with an abutment, a backnut removably attachable to the entry component, a cavity extending through the entry component and the backnut, and a grounding device configured to rest against the abutment, the grounding device including a rim, an inner edge, and a plurality of fingers extending inward and downward from the inner edge, wherein the grounding device is included of a conductive material. The grounding device may be comprised of spring steel.

The rim may have a flat lower surface for resting against the abutment. In some embodiments, the cable gland further includes a seal compressible in the cable gland between the backnut and the grounding device and/or a washer between the backnut and the seal.

In some embodiments, each of the plurality of fingers extends downward at an angle of at least fifteen (15) degrees with respect to a plane defined by the rim. Further, the grounding device may include an intermediate portion between the rim and the plurality of fingers, the intermediate portion including the inner edge, wherein the intermediate portion extends below the rim and includes an angled portion adjacent to the plurality of fingers.

In some embodiments, each of the plurality of fingers is substantially flat and has a length and a maximum width, the length being greater than the maximum width. In some embodiments, each of the plurality of fingers has the maximum width along a majority of its length and a second width at a base portion adjacent to the inner edge, the second width being less than the maximum width. Each of the plurality of fingers may also have a concave distal end.

Further provided is a grounding device including an upper rim, an intermediate portion defining an inner edge, a plurality of fingers extending inward and downward from the inner edge, wherein the grounding device is included of a conductive material. The grounding device may be comprised of spring steel. The intermediate portion may extend below the upper rim and/or include an angled portion adjacent to the plurality of fingers. In some embodiments, each of the plurality of fingers extend downward at an angle of at least fifteen (15) degrees with respect to a plane defined by the upper rim. In some embodiments, the plurality of fingers includes at least six fingers.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions, or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

Figure 1:
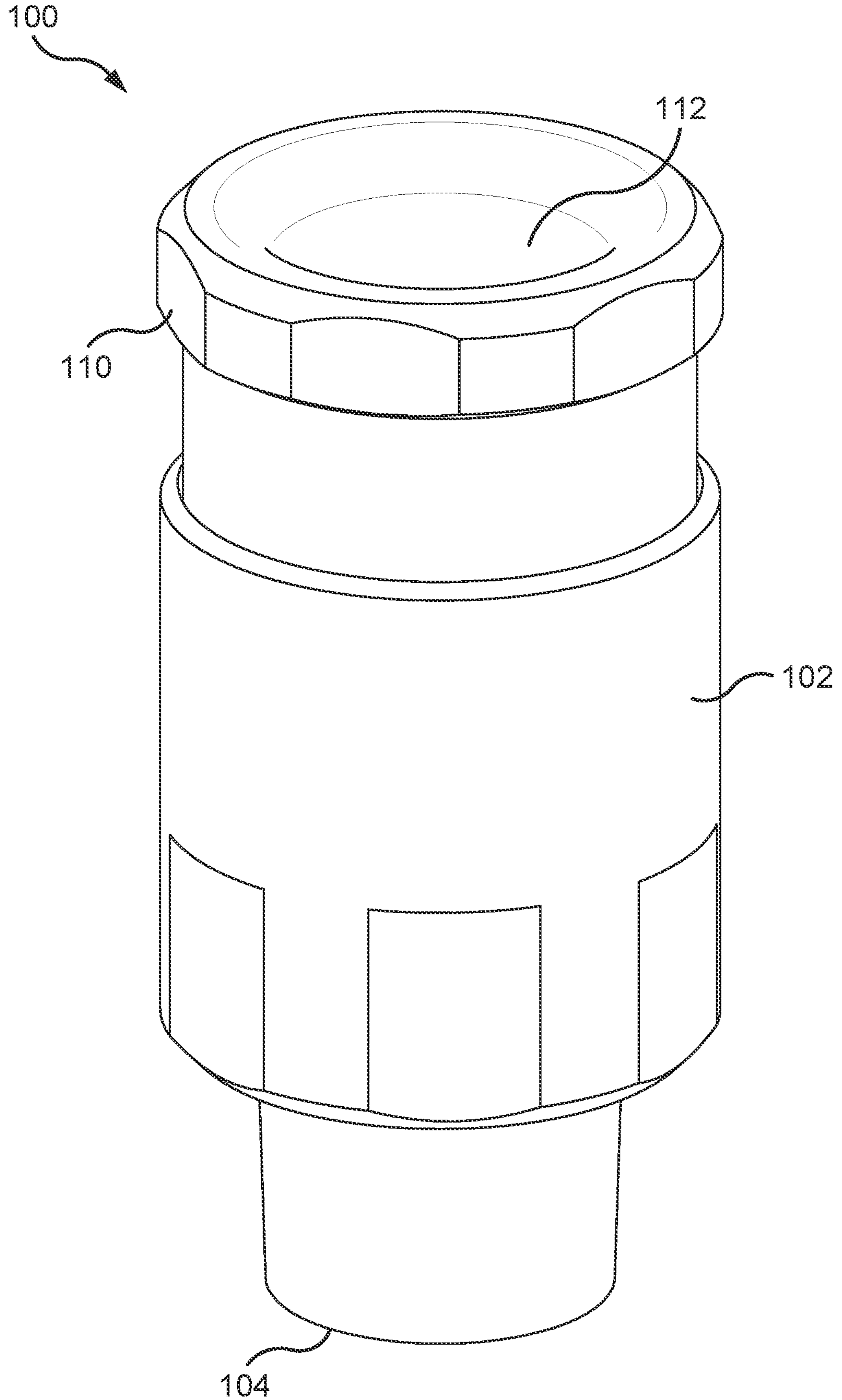
FIG. 1 is an isometric view of cable gland according to an exemplary embodiment of the present disclosure.

FIG. 1 shows a cable gland 100 according to an exemplary embodiment of the present disclosure. The cable gland 100 includes an entry component 102 with an opening 104. The cable gland 100 further includes a backnut 110 with an opening 112. The backnut 110 is removably attachable to the entry component 102. For example, an exterior surface of the backnut 110 may have threads that engage with threads on an interior surface of the entry component 102. The cable gland 100 has a cavity extending, e.g., along a central axis, through the entry component 102 and the backnut 110 from the opening 104 to the opening 112.

Figure 2:
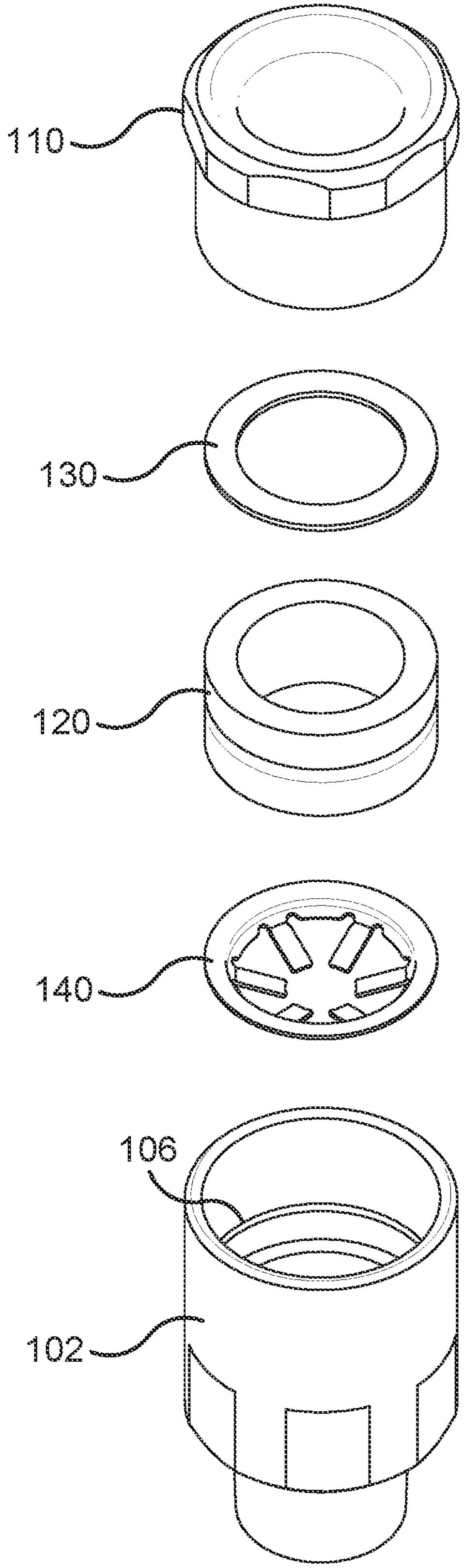
FIG. 2 is an exploded view of the cable gland shown in FIG. 1.

FIG. 2 is an exploded view of the cable gland 100. As shown, the cable gland 100 may include a seal 120 (e.g., ingress seal), a washer 130, and a grounding device 140. The grounding device 140 may be referred to as a grounding tang. An abutment 106 on an inner surface of the entry component 102 receives the grounding device 140.

Figure 3A:
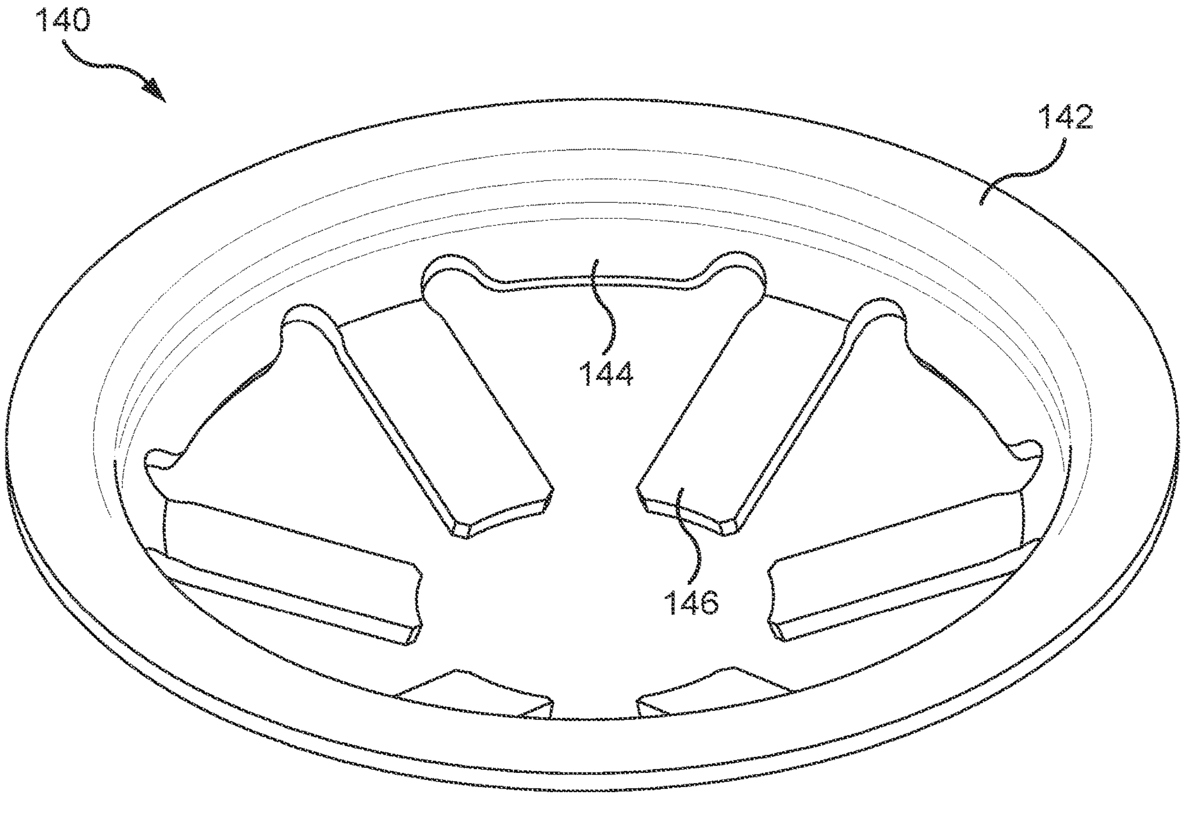
FIG. 3A is an isometric view of a grounding device according to an exemplary embodiment of the present disclosure.
Figure 3B:
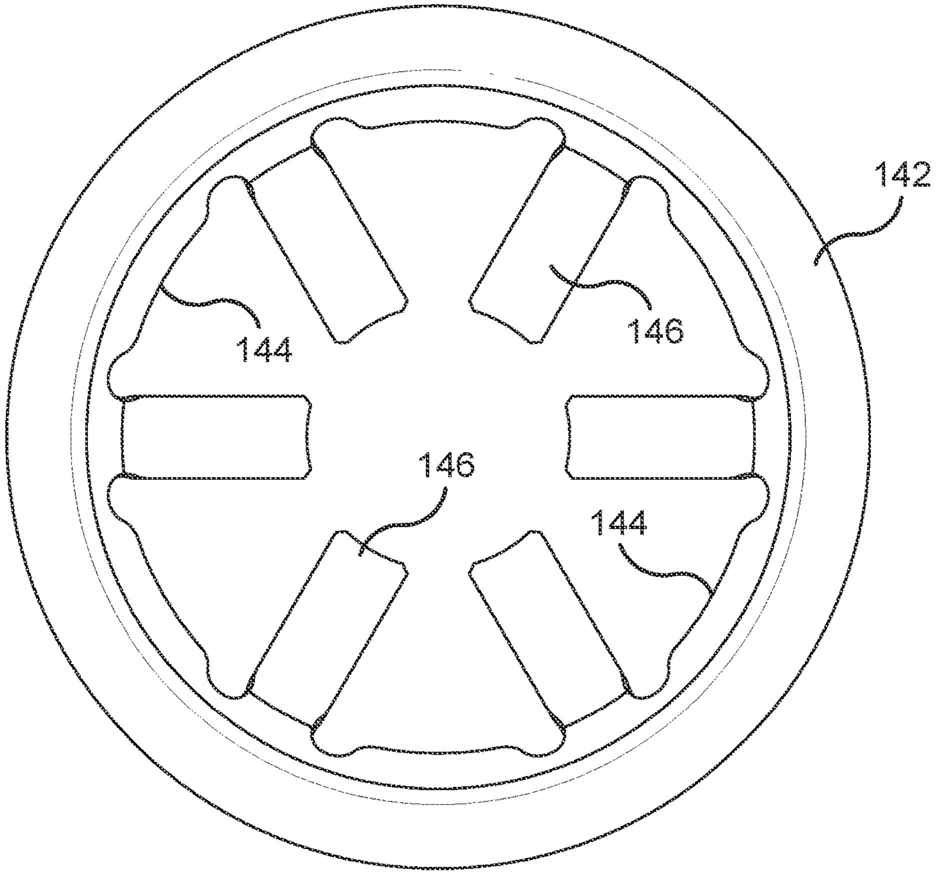
FIG. 3B is a top view of the grounding device shown in FIG. 3A.
Figure 3C:
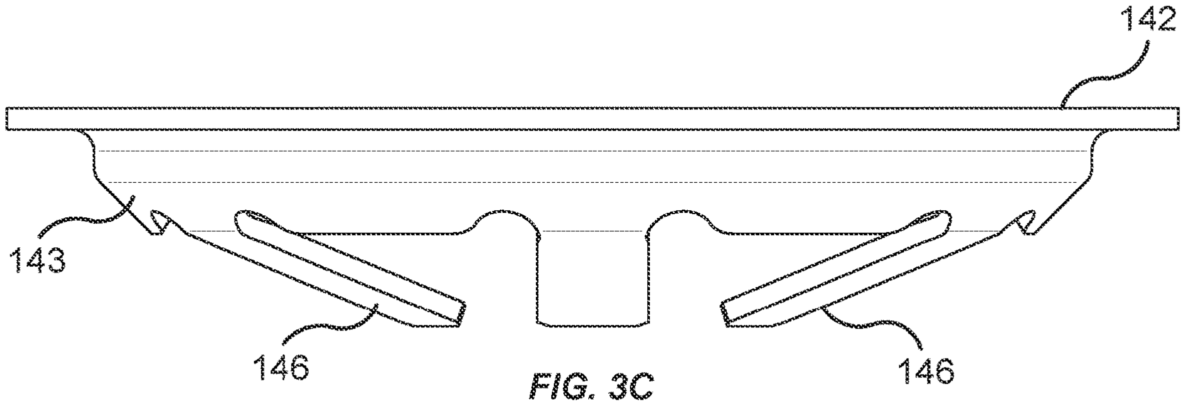
FIG. 3C is a side view of the grounding device shown in FIG. 3A.

FIGS. 3A-3C further illustrate the grounding device 140. The grounding device 140 has an upper rim 142 and an intermediate portion 143 with an inner edge 144 and a plurality of tabs or fingers 146. In the exemplary embodiment, the fingers 146 are substantially flat. The upper rim 142 is sized and shaped to be received by the abutment 106 in the cable gland 100. For example, the upper rim 142 may have a diameter approximately equal to or less than an inner diameter of a respective cable gland 100, a flat bottom surface, and a width (on the bottom surface) approximately equal to or less than the abutment 106 in the cable gland 100. The grounding device 140 is comprised of or consists of a conductive material.

The plurality of tabs or fingers 146 extend inward from the inner edge 144. The fingers 146 are flexible and configured to return to their original positions after being flexed. In the exemplary embodiment, there are six (6) equally spaced fingers 146 each having a generally constant width along a majority of its length. The width at the base of each finger 146 may be the same or, as shown in FIG. 3A, may be partially reduced to facilitate flexing of the finger 146. A distal end of each finger 146 may be concave for contacting a generally cylindrical cable, such as a ½ in. armored cable. Each of the fingers 146 may have a substantially flat top surface and a substantially flat bottom surface, though the invention is not limited thereto. In some embodiments, each of the plurality of fingers 146 has a length and a maximum width, the length being greater than the maximum width.

In the exemplary embodiment, the upper rim 142 has an outer diameter of approximately 1.1 in. The intermediate portion 143 of the grounding device 140 has an outer diameter of approximately 0.94 in. Each of the fingers 146 has a width of approximately 0.105 in. At the base of each finger 146, there is a reduced width of approximately 0.094 in. defined by an approximately 0.063 in. diameter relief cutout. Each finger 146 extends approximately 0.24 in. inward from the inner edge 144 which defines an inner diameter of approximately 0.33 in. for the grounding device 140. The inner diameter is suitable for receiving a ½ in. size cable with an outer diameter of approximately 0.40 to 0.65 in. The grounding device 140 also has an overall height of approximately 0.2 in. and a thickness throughout of approximately 0.02 in. These dimensions are only exemplary and are not intended to limit the invention.

The grounding device 140 is made of a spring steel to create "memory" to its manufactured shape as well as provide metallic/electrical contact between the grounding device 140 and a cable, such as an armored cable, that is passed therethrough. The fingers 146 are arranged in a circular pattern and bent downward at an angle to provide enough resistance to grab the cable while permitting a range of cable diameters to be passed thru with a reasonable sufficient force. In the exemplary embodiment, the fingers 146 extend down at an angle of at least 15 degrees, such as approximately 20 degrees, with respect to a plane defined by the upper rim 142. The intermediate portion 143 may also have an angled portion adjacent to the base of each finger 146 extending down at an angle of approximately 45 degrees.

Figure 7:
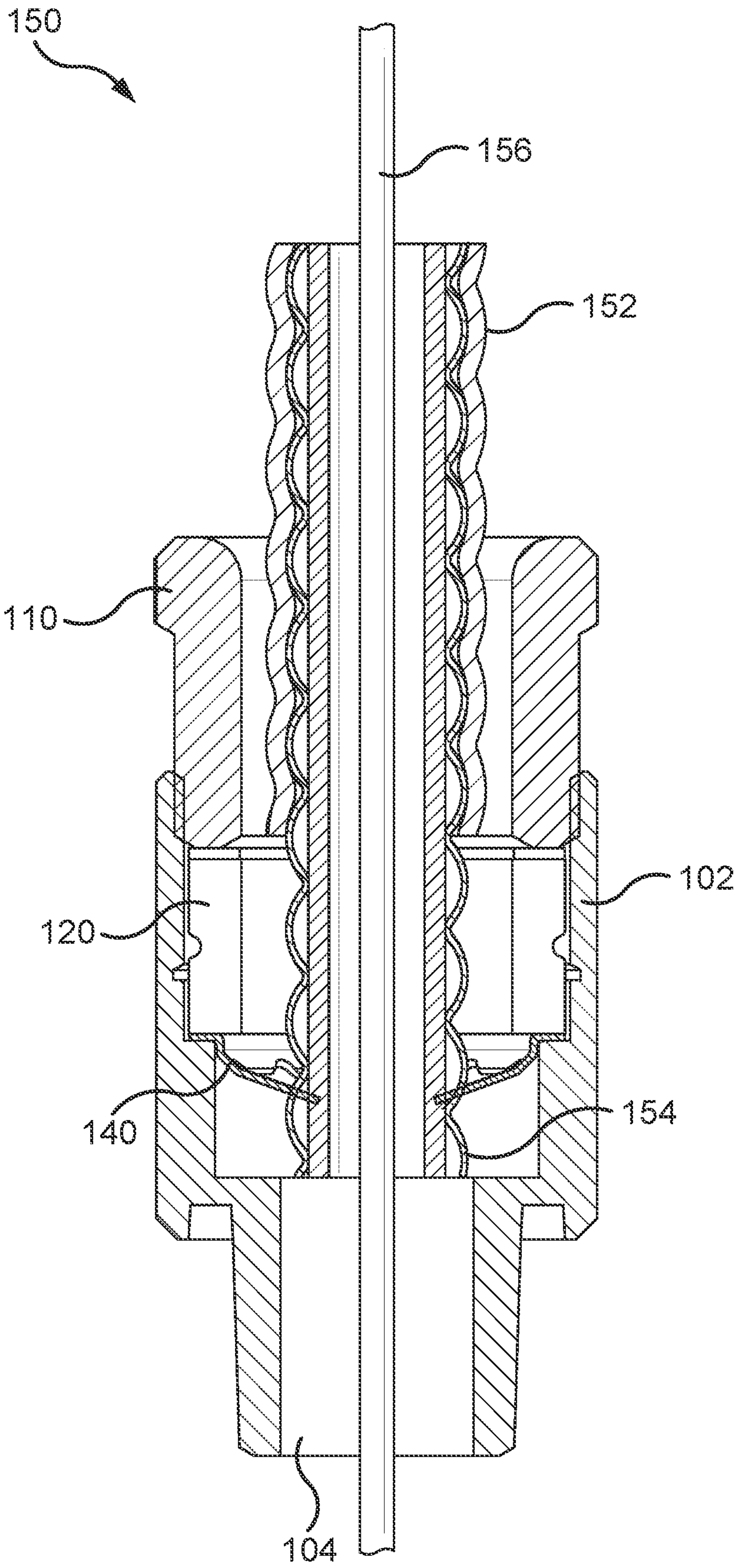
FIG. 7 is sectional view of a cable gland including a grounding device according to an exemplary embodiment of the present disclosure.
Figure 8:
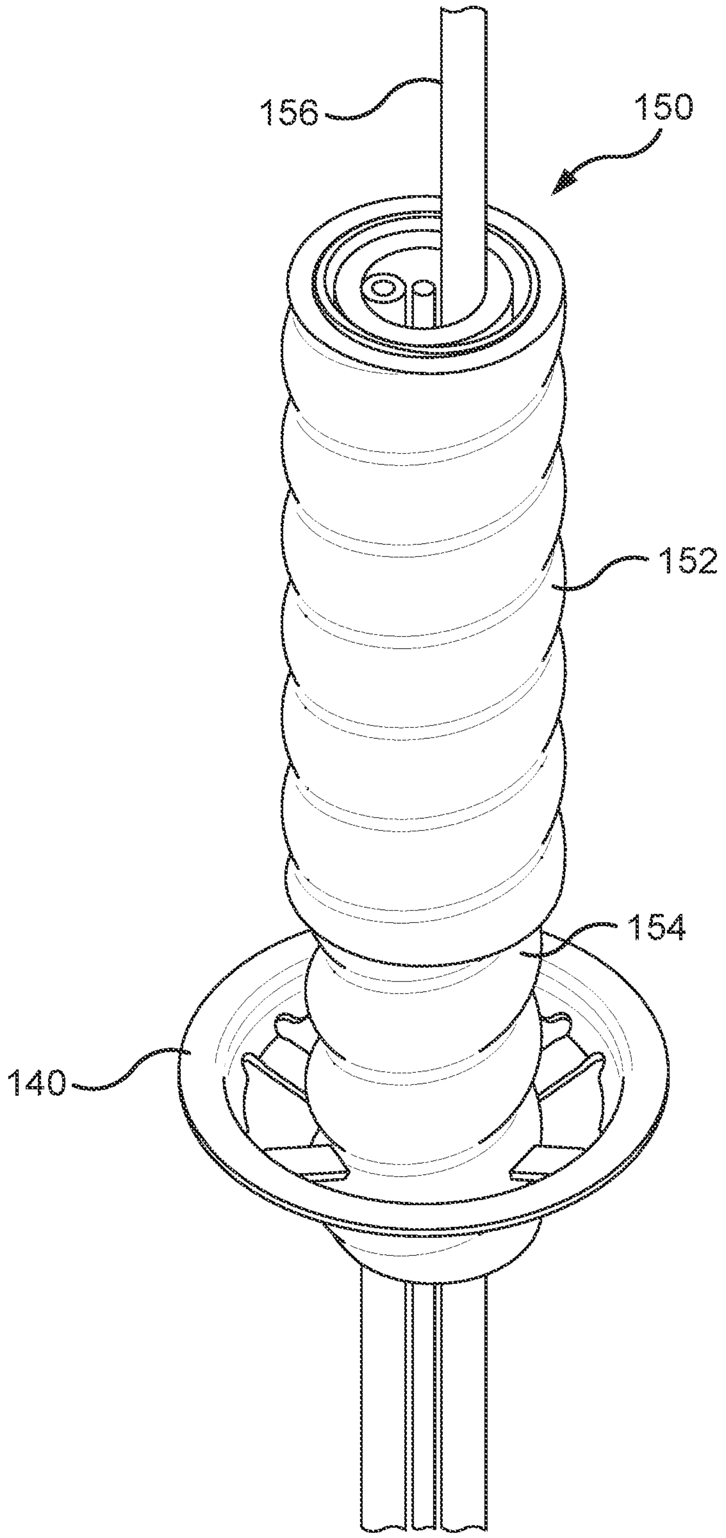
FIG. 8 is an isometric view of a grounding device according to an exemplary embodiment of the present disclosure around a conductor.

FIG. 7 shows a cutaway view of the cable gland 100 with a cable 150 extending therethrough. FIG. 8 is an isometric view of the grounding device 140 of the cable gland 100 around the cable 150 with the remaining components of the cable gland 100 removed for illustrative purposes. As shown in FIG. 7, the grounding device 140 rests on the abutment 106 on the interior surface of the entry component 102. The seal 120 is pressed against the grounding device 140 by the backnut 110 with the washer 130 in between. Thus, the grounding device 140 is generally fixed in position within the cable gland 100.

The cable 150 may, for example, be an armored electrical cable with an outer layer 152, an armor layer 154, and one or a plurality of conductors 156. In the exemplary embodiment, the outer layer 152 may be a PVC jacket. The outer layer 152 is at least partially removed to expose the armor layer 154.

The spring steel memory of the grounding device 140 creates resistance/pressure against the armor layer 154 of the cable 150, creating an electrical ground path from the cable 150 to the grounding device 140. Thus, a grounding path can be achieved between the cable 150 and the cable gland 100 by pushing the cable 150 through the grounding device 140 rather than requiring a particular compression of the backnut 110 as used in prior art methods.

Figure 4A:
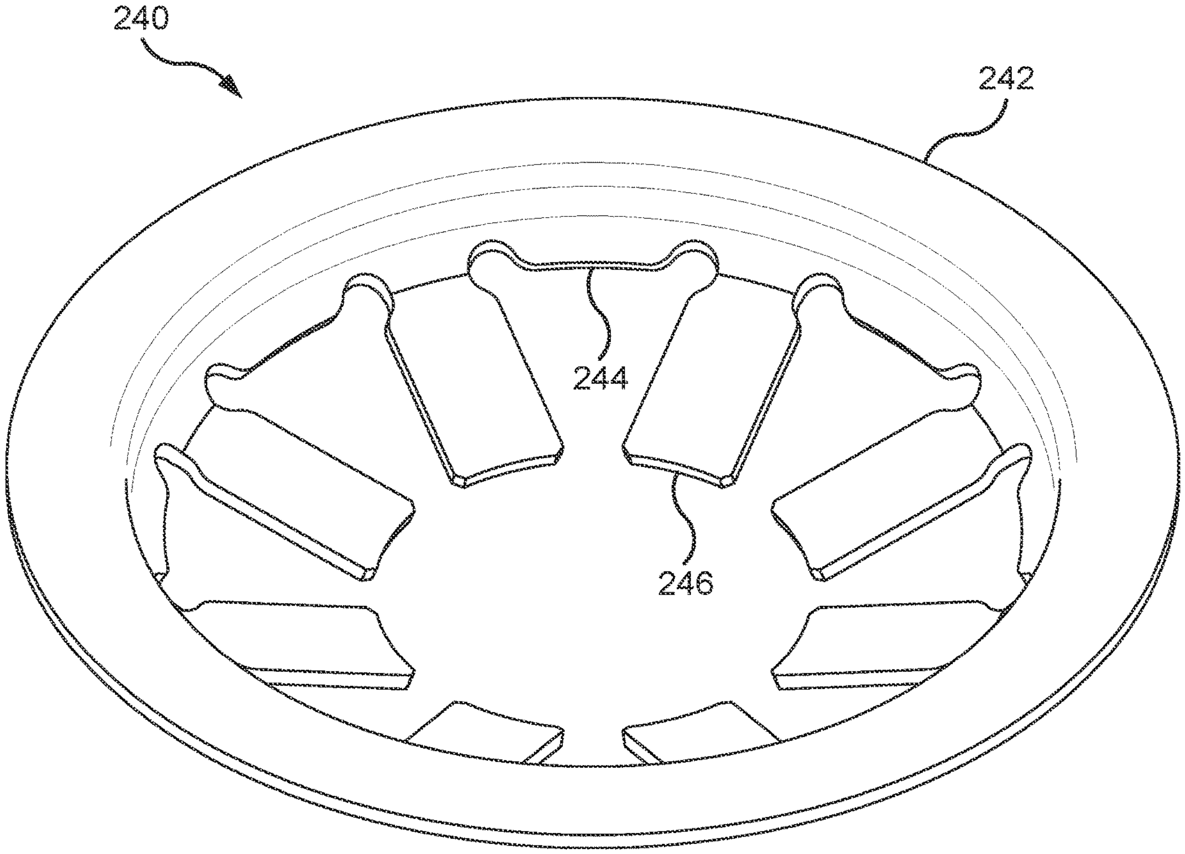
FIG. 4A is an isometric view of a grounding device according to an exemplary embodiment of the present disclosure.
Figure 4B:
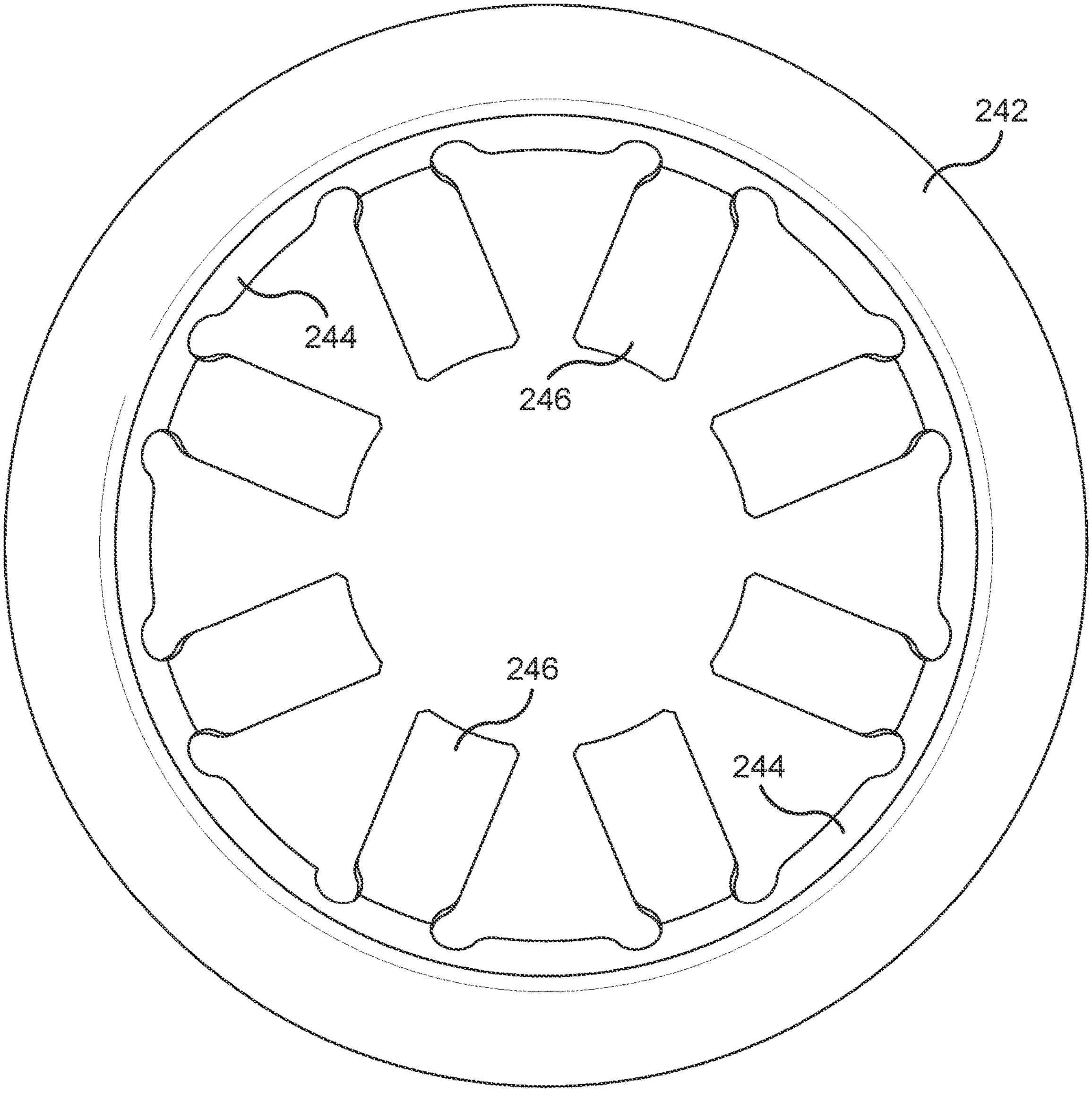
FIG. 4B is a top view of the grounding device shown in FIG. 4A.
Figure 4C:
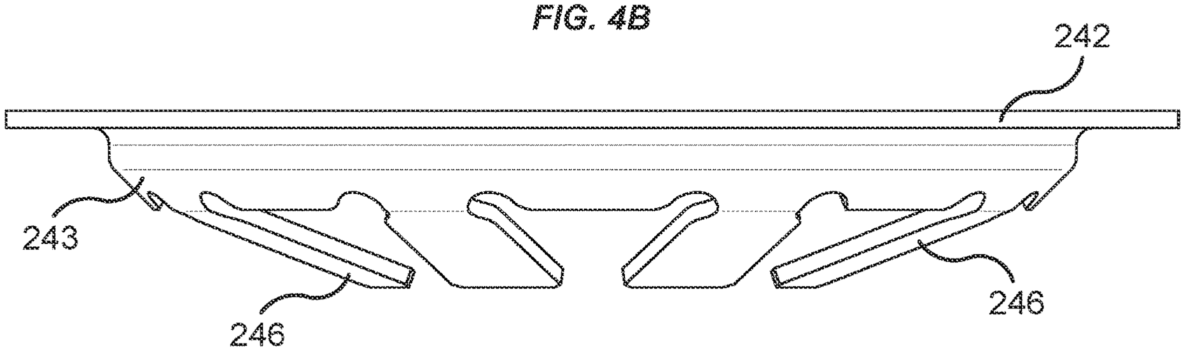
FIG. 4C is a side view of the grounding device shown in FIG. 4A.

Ground devices according to the invention may have different diameters, sizes of fingers, and numbers of fingers, e.g., to accommodate different cable glands, different cables, and to provide different levels of mechanical resistance. For example. FIGS. 4A-4C show another grounding device 240 according to an exemplary embodiment of the present disclosure. The grounding device 240 has an upper rim 242 and an intermediate portion 243 with an inner edge 244 and a plurality of tabs or fingers 246. The upper rim 242 is sized and shaped to be received by an abutment in a cable gland. The plurality of tabs or fingers 246 extend inward from the inner edge 244. In the exemplary embodiment, there are eight (8) equally spaced fingers 246. The width at the base of each finger 246 is reduced to facilitate flexing of the finger 246.

In the exemplary embodiment, the upper rim 242 has an outer diameter of approximately 1.39 in. The intermediate portion 243 of the grounding device 240 has an outer diameter of approximately 1.15 in. Each of the fingers 246 a width of approximately 0.140 in. At the base of each finger 246, there is a reduced width of approximately 0.101 in. defined by a 0.063 in. diameter relief cutout. Each finger 246 extends approximately 0.25 in. inward from the inner edge 244 which defines an inner diameter of approximately 0.52 in. for the grounding device 140. The inner diameter is suitable for receiving a ¾ in. size cable with an outer diameter of approximately 0.62 to 0.82 in. The grounding device 240 has an overall height of approximately 0.21 in. and a thickness throughout of approximately 0.02 in. These dimensions are only exemplary and are not intended to limit the invention.

Figure 5A:
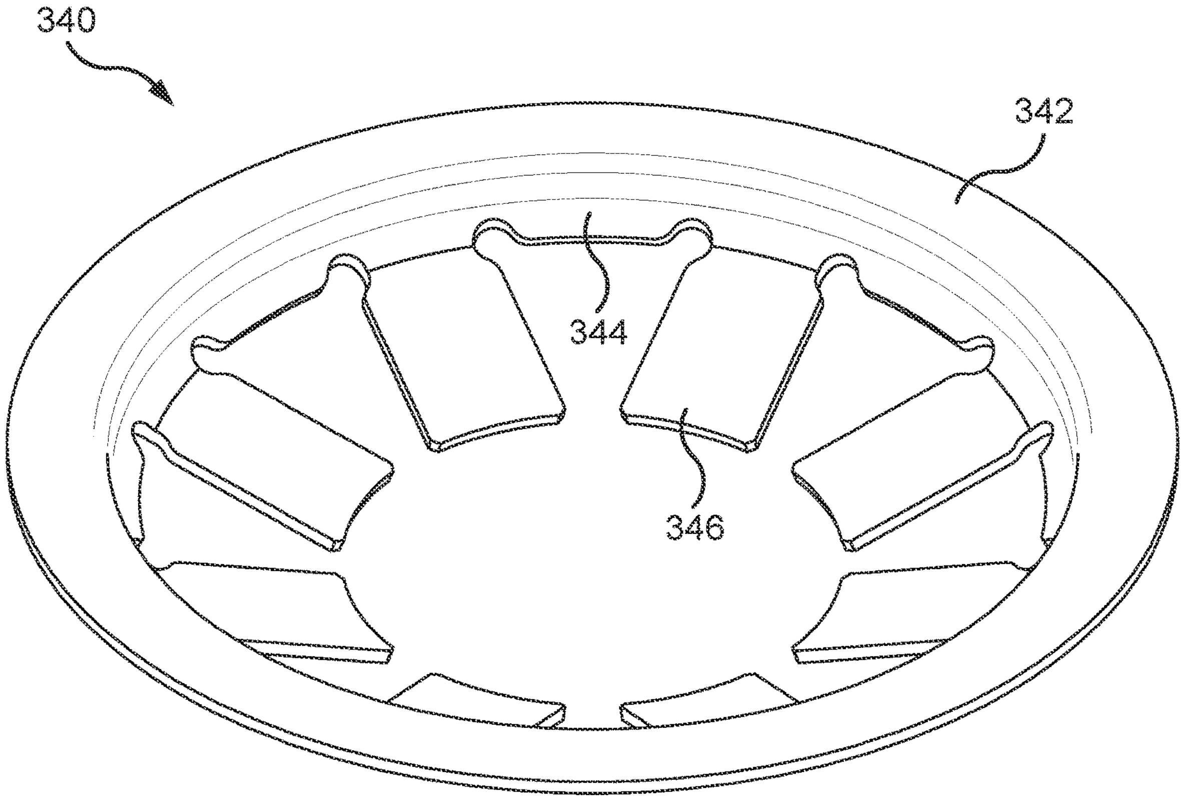
FIG. 5A is an isometric view of a grounding device according to an exemplary embodiment of the present disclosure.
Figure 5B:
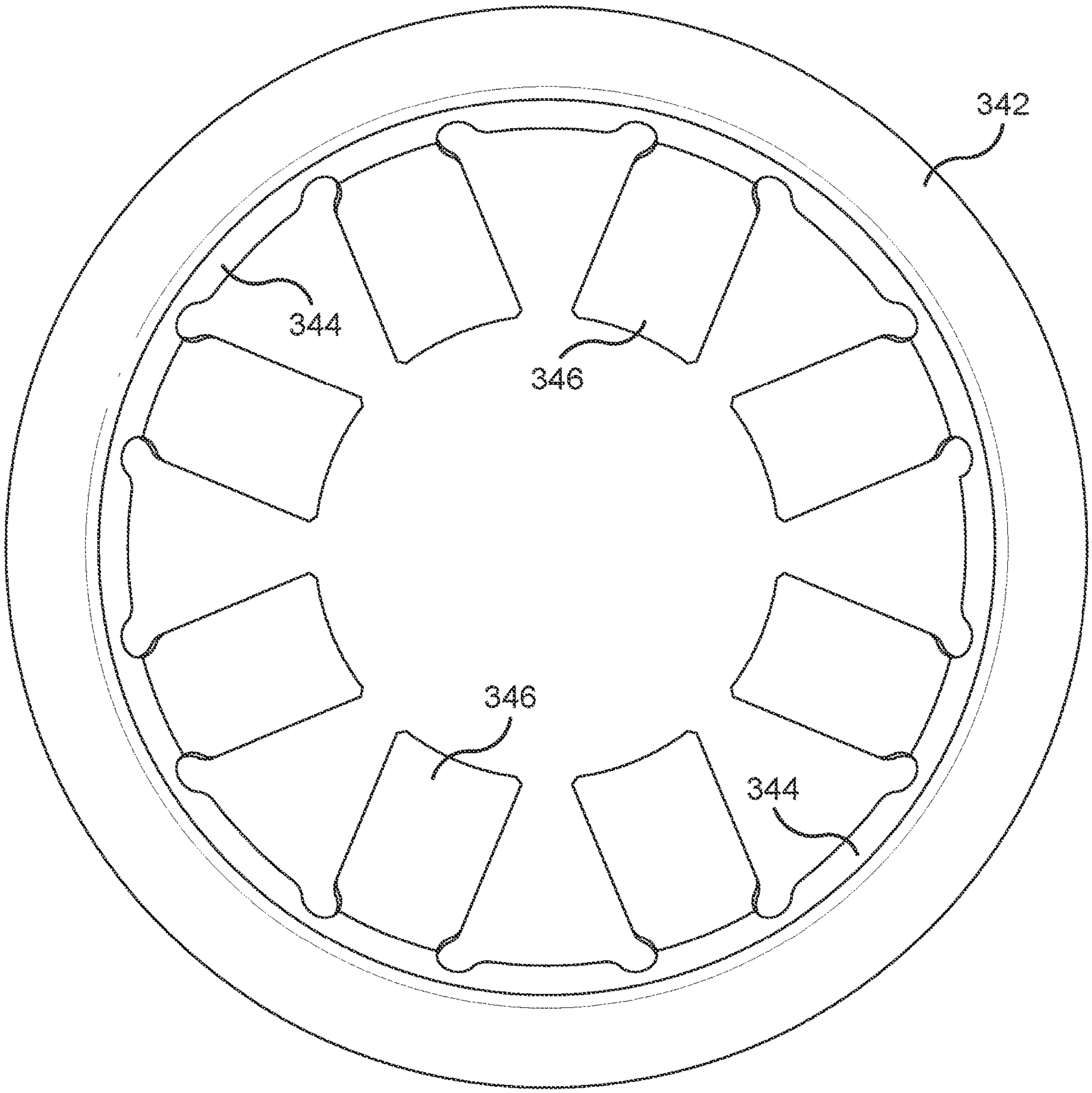
FIG. 5B is a top view of the grounding device shown in FIG. 5A.
Figure 5C:
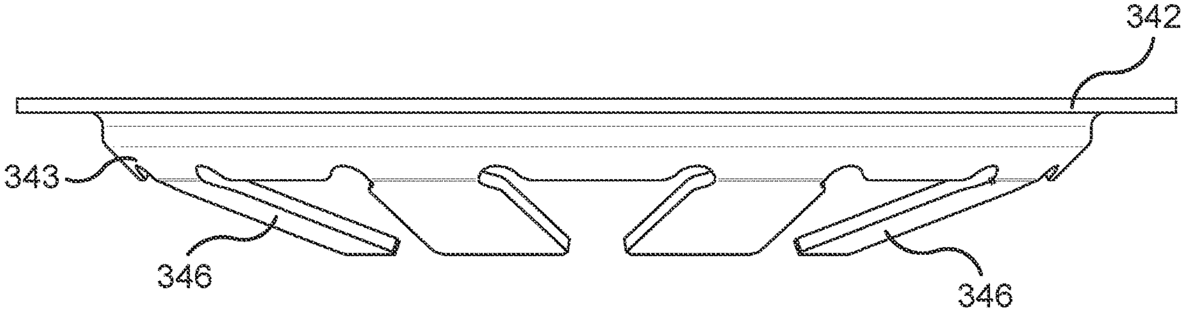
FIG. 5C is a side view of the grounding device shown in FIG. 5A.

FIGS. 5A-5C show another grounding device 340 according to an exemplary embodiment of the present disclosure. The grounding device 340 has an upper rim 342 and an intermediate portion 343 with an inner edge 344 and a plurality of tabs or fingers 346. The upper rim 342 is sized and shaped to be received by an abutment in a cable gland. The plurality of tabs or fingers 346 extend inward from the inner edge 344. In the exemplary embodiment, there are eight (8) equally spaced fingers 346. The fingers 346 are wider than in previous embodiments to provide further contact with a cable. The width at the base of each finger 346 is reduced to facilitate flexing of the finger 346.

In the exemplary embodiment, the upper rim 342 has an outer diameter of approximately 1.67 in. The intermediate portion 343 of the grounding device 340 has an outer diameter of approximately 1.42 in. Each of the fingers 346 has a width of approximately 0.207 in. At the base of each finger 346, there is a reduced width of approximately 0.164 in. defined by an approximately 0.063 in. diameter relief cutout. Each finger 346 extends approximately 0.29 in. inward from the inner edge 344 which defines an inner diameter of approximately 0.71 in. for the grounding device 340. The inner diameter is suitable for receiving a 1 in. size cable with an outer diameter of approximately 0.85 to 0.1.03 in. The grounding device 340 has an overall height of approximately 0.22 in. and a thickness throughout of approximately 0.02 in. These dimensions are only exemplary and are not intended to limit the invention.

Figure 6A:
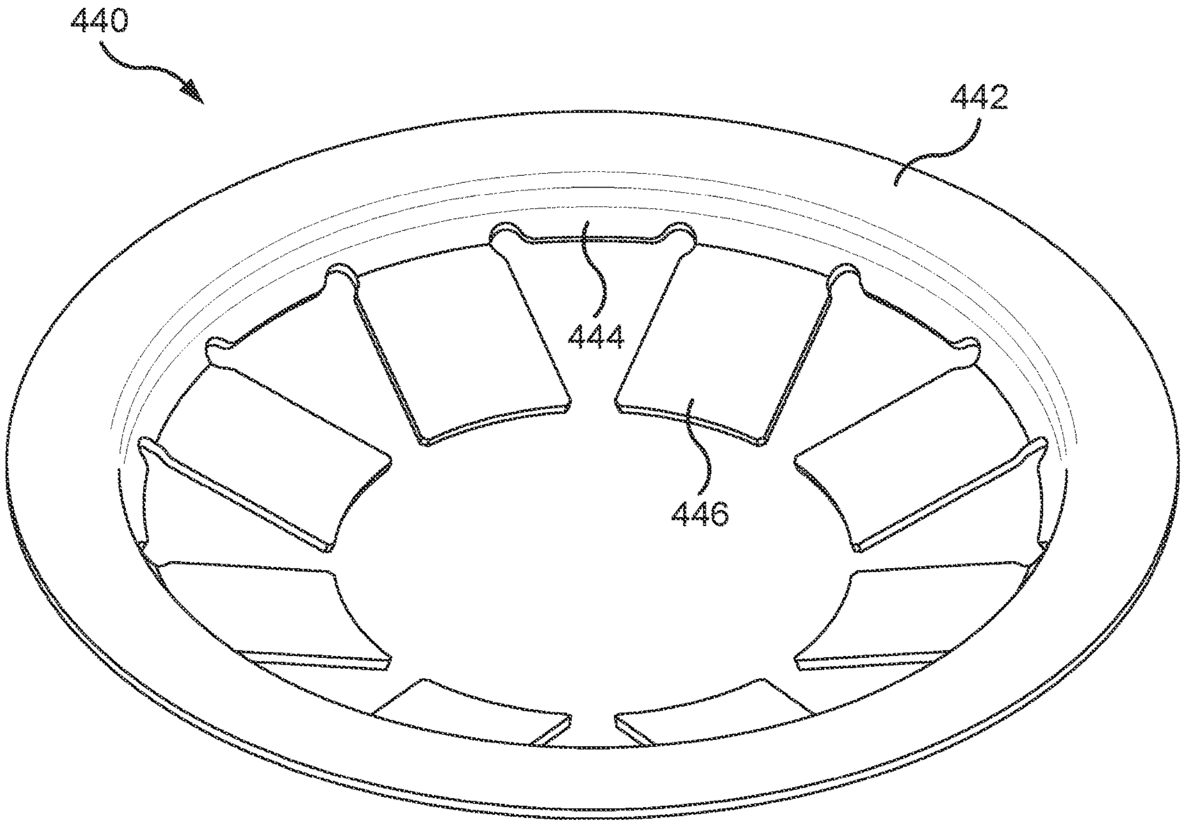
FIG. 6A is an isometric view of a grounding device according to an exemplary embodiment of the present disclosure.
Figure 6B:
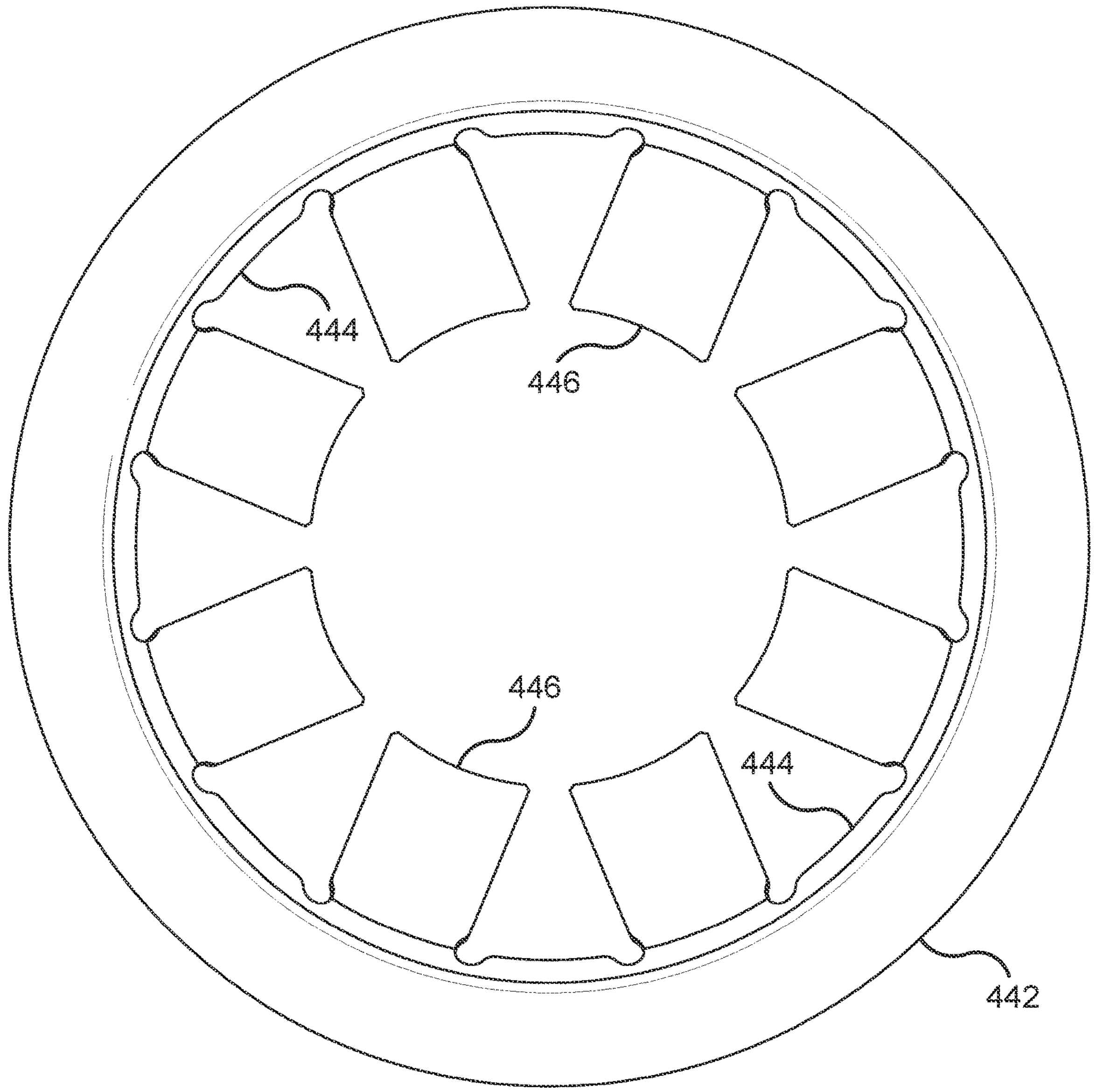
FIG. 6B is a top view of the grounding device shown in FIG. 6A.
Figure 6C:
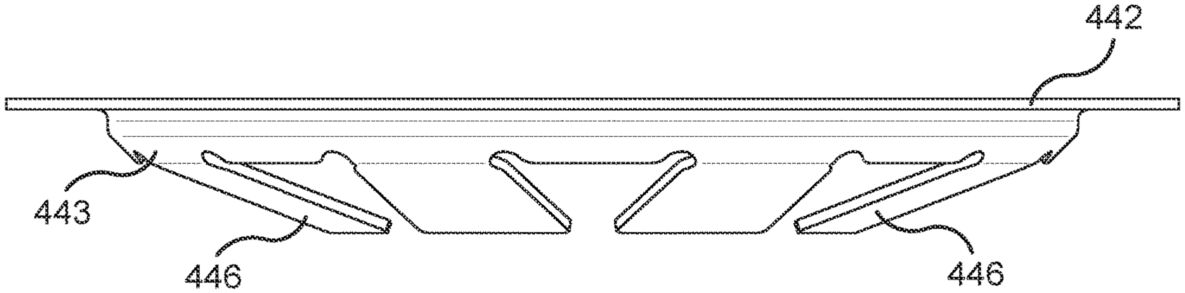
FIG. 6C is a side view of the grounding device shown in FIG. 6A.

FIGS. 6A-6C show another grounding device 440 according to an exemplary embodiment of the present disclosure. The grounding device 440 has an upper rim 442 and an intermediate portion 443 with an inner edge 444 and a plurality of tabs or fingers 446. The upper rim 442 is sized and shaped to be received by an abutment in a cable gland. The plurality of tabs or fingers 446 extend inward from the inner edge 444. In the exemplary embodiment, there are eight (8) equally spaced fingers 446. The fingers 446 are wider than in previous embodiments to provide further contact with a cable. The width at the base of each finger 446 is reduced to facilitate flexing of the finger 446.

In the exemplary embodiment, the upper rim 442 has an outer diameter of approximately 2.13 in. The intermediate portion 443 of the grounding device 440 has an outer diameter of approximately 1.80 in. Each of the fingers 446 has a width of approximately 0.29 in. At the base of each finger 446, there is a reduced width of approximately 0.27 in. defined by an approximately 0.063 in. diameter relief cutout. Each finger 446 extends approximately 0.34 in. inward from the inner edge 444 which defines an inner diameter of approximately 0.95 in. for the grounding device 440. The inner diameter is suitable for receiving a 1¼ in. size cable with an outer diameter of approximately 1.14 to 1.30 in. The grounding device 440 has an overall height of approximately 0.24 in. and a thickness throughout of approximately 0.02 in. These dimensions are only exemplary and are not intended to limit the invention.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A cable gland, comprising:

an entry component including an inner surface with an abutment;

a backnut removably attachable to the entry component;

a cavity extending through the entry component and the backnut; and a grounding device including:

an upper rim having a flat lower surface configured to rest in a fixed position against the abutment, an annular intermediate portion, radially inward of the upper rim, with an inner edge radially inward of and below the upper rim and an annular outer surface below and extending perpendicular to the flat lower surface of the upper rim configured to engage against the inner surface of the entry component, and a plurality of fingers extending inward and downward from the inner edge;

wherein the grounding device is comprised of a conductive spring steel material, wherein the annular intermediate portion includes an angled portion adjacent to the plurality of fingers, and wherein each of the plurality of fingers are configured to flex outward to receive a cable and maintain inward pressure on the cable creating an electrical ground path from the cable to the grounding device.

2. The cable gland of claim 1, further comprising a seal compressible in the cable gland between the backnut and the grounding device.

3. The cable gland of claim 2, further comprising a washer between the backnut and the seal.

4. The cable gland of claim 1, wherein each of the plurality of fingers extends downward at an angle of at least 15 degrees with respect to a plane defined by the upper rim.

5. The cable gland of claim 1, wherein each of the plurality of fingers is substantially flat and has a length and a maximum width, the length being greater than the maximum width.

6. The cable gland of claim 5, wherein each of the plurality of fingers has the maximum width along a majority of its length and a second width at a base portion adjacent to the inner edge, the second width being less than the maximum width.

7. The cable gland of claim 5, wherein each of the plurality of fingers has a concave distal end.

8. The cable gland of claim 1, wherein distal ends of the plurality of fingers define an inner diameter, wherein the inner diameter increases upon receiving the cable.

9. The cable gland of claim 1, wherein the annular outer surface has a height that is uniform around a circumference of the annular outer surface.

10. A grounding device, comprising:

an upper rim;

an annular intermediate portion radially inward of the upper rim with an inner edge radially inward of and below the upper rim;

a plurality of fingers extending inward and downward from the inner edge;

wherein the grounding device is comprised of a conductive spring steel material, wherein the upper rim has a flat lower surface, extending between an outer diameter of the upper rim and the annular intermediate portion, for resting against an abutment, wherein the intermediate portion has an annular outer surface below and extending perpendicular to the flat lower surface of the upper rim, wherein the annular intermediate portion includes an angled portion adjacent to the plurality of fingers, and wherein each of the plurality of fingers are configured to flex outward to receive a cable and maintain inward pressure on the cable creating an electrical ground path from the cable to the grounding device.

11. The grounding device of claim 10, wherein each of the plurality of fingers extends downward at an angle of at least 15 degrees with respect to a plane defined by the upper rim.

12. The grounding device of claim 10, wherein each of the plurality of fingers is substantially flat and has a length and a maximum width, the length being greater than the maximum width.

13. The grounding device of claim 12, wherein each of the plurality of fingers has the maximum width along a majority of its length and a second width at a base portion adjacent to the inner edge, the second width being less than the maximum width.

14. The grounding device of claim 10, wherein each of the plurality of fingers has a concave distal end.

15. The grounding device of claim 10, wherein the plurality of fingers includes at least six fingers.

16. The grounding device of claim 10, wherein the annular outer surface has a height that is uniform around a circumference of the annular outer surface.

* * * * *